(12) United States Patent
Balzer et al.

(10) Patent No.: US 10,812,343 B2
(45) Date of Patent: Oct. 20, 2020

(54) BOT NETWORK ORCHESTRATION TO PROVIDE ENRICHED SERVICE REQUEST RESPONSES

(71) Applicant: MICROSOFT TECHNOLOGY LICENSING, LLC, Redmond, WA (US)

(72) Inventors: Andreas Balzer, Dublin (IE); Alan Mulhall, Dublin (IE); Stephen O'Driscoll, Dublin (IE); Muiris Woulfe, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 15/668,340

(22) Filed: Aug. 3, 2017

(65) Prior Publication Data
US 2019/0044829 A1 Feb. 7, 2019

(51) Int. Cl.
*H04L 12/24* (2006.01)
*H04L 29/08* (2006.01)
(Continued)

(52) U.S. Cl.
CPC .......... *H04L 41/5006* (2013.01); *G06F 9/547* (2013.01); *G06F 16/13* (2019.01);
(Continued)

(58) Field of Classification Search
CPC ... H04L 41/5006; H04L 41/046; H04L 41/28; H04L 67/06; H04L 67/22; H04L 67/2809;
(Continued)

(56) References Cited

U.S. PATENT DOCUMENTS

| 6,950,875 B1 * | 9/2005 | Slaughter ................ G06F 9/465 707/E17.032 |
| 7,047,243 B2 | 5/2006 | Cabrera et al. |

(Continued)

OTHER PUBLICATIONS

"Enterprise service bus", Retrieved From: <<https://en.wikipedia.org/wiki/Enterprise_service-bus>>, Retrieved Date: May 24, 2017, 7 Pages.

(Continued)

*Primary Examiner* — Jerry B Dennison
(74) *Attorney, Agent, or Firm* — Newport IP, LLC; Michael C. Johnson

(57) ABSTRACT

An increasing number of bots become available each day that perform automated tasks over the Internet to help facilitate a variety of service requests for a user. Thus, embodiments are directed to an orchestration service configured to perform bot network orchestration in order to provide enriched responses to service requests and/or in order to find one accurate answer among large numbers of bot responses to a specific query. For example, a service request for a user that involves at least one service provider may be received. A plurality of bots to orchestrate a processing of the service request may be determined. Instructions may be provided to the bots associated with aspects of the service request, where each bot is selected based on an aspect of the service request. Responses received from the bots may be integrated into a service response and provided to a requestor of the service request.

20 Claims, 8 Drawing Sheets

(51) Int. Cl.
  *G06N 20/00* (2019.01)
  *G06F 16/13* (2019.01)
  *G06F 16/958* (2019.01)
  *G06Q 30/00* (2012.01)
  *G06F 9/54* (2006.01)
  *G06N 3/00* (2006.01)

(52) U.S. Cl.
  CPC ........... *G06F 16/958* (2019.01); *G06N 3/006* (2013.01); *G06N 20/00* (2019.01); *G06Q 30/00* (2013.01); *H04L 41/046* (2013.01); *H04L 41/28* (2013.01); *H04L 67/06* (2013.01); *H04L 67/22* (2013.01); *H04L 67/2809* (2013.01); *H04L 67/2838* (2013.01); *H04L 67/306* (2013.01); *H04L 67/32* (2013.01); *H04L 67/327* (2013.01); *H04L 67/10* (2013.01); *H04L 67/12* (2013.01); *H04L 67/18* (2013.01)

(58) Field of Classification Search
  CPC ... H04L 67/2838; H04L 67/306; H04L 67/32; H04L 67/327; H04L 67/10; H04L 67/12; H04L 67/18; G06F 16/958; G06F 16/13; G06F 9/547; G06N 20/00; G06Q 30/00
  USPC ............................................................ 709/223
  See application file for complete search history.

(56) References Cited

U.S. PATENT DOCUMENTS

| | | | |
|---|---|---|---|
| 7,526,452 B2 | 4/2009 | Agarwal et al. | |
| 7,797,198 B1 | 9/2010 | Frederick et al. | |
| 7,912,938 B2 | 3/2011 | Sayal et al. | |
| 8,255,251 B2 | 8/2012 | Sato et al. | |
| 8,640,149 B2 | 1/2014 | Liu et al. | |
| 8,875,135 B2* | 10/2014 | Ma | G06F 9/5038 718/100 |
| 9,717,012 B2* | 7/2017 | Zakaria | H04M 1/72519 |
| 9,838,268 B1* | 12/2017 | Mattson | H04L 41/32 |
| 10,311,372 B1* | 6/2019 | Hotchkies | H04L 67/2885 |
| 2002/0087674 A1* | 7/2002 | Guilford | H04W 48/18 709/223 |
| 2003/0172133 A1* | 9/2003 | Smith | G06Q 30/02 709/219 |
| 2006/0085423 A1 | 4/2006 | Barsness et al. | |
| 2006/0100788 A1* | 5/2006 | Carrino | G06Q 30/0627 702/19 |
| 2007/0073883 A1* | 3/2007 | Chafle | H04L 43/00 709/226 |
| 2008/0177648 A1 | 7/2008 | Doyle et al. | |
| 2012/0278430 A1* | 11/2012 | Lehane | H04L 41/5054 709/217 |
| 2013/0111487 A1* | 5/2013 | Cheyer | H04M 1/72563 718/102 |
| 2013/0132308 A1* | 5/2013 | Boss | G06Q 50/00 706/12 |
| 2014/0095245 A1* | 4/2014 | Walsh | G06Q 10/06315 705/7.25 |
| 2014/0143825 A1* | 5/2014 | Behrendt | G06F 21/552 726/1 |
| 2014/0331073 A1* | 11/2014 | Feng | H04W 52/0216 713/340 |
| 2015/0006719 A1* | 1/2015 | Gupta | H04L 67/16 709/224 |
| 2015/0244735 A1* | 8/2015 | Kumar | G06F 21/52 726/23 |
| 2015/0381776 A1* | 12/2015 | Seed | H04W 4/70 709/203 |
| 2016/0014568 A1* | 1/2016 | Naqvi | H04W 4/06 455/457 |
| 2016/0350674 A1* | 12/2016 | Midboe | H04L 67/327 |
| 2017/0366428 A1* | 12/2017 | Shaw | H04L 67/10 |
| 2017/0372231 A1* | 12/2017 | Ghatage | G06F 40/58 |
| 2018/0349844 A1* | 12/2018 | Bounasser | G06Q 10/0833 |
| 2019/0303375 A1* | 10/2019 | Bai | G06N 20/00 |
| 2019/0340521 A1* | 11/2019 | Liu | G06F 16/9535 |

OTHER PUBLICATIONS

"Microsoft on the Enterprise Service Bus (ESB)", Retrieved From: <<https://msdn.microsoft.com/en-us/library/aa475433(v=bts.10).aspx>>, Aug. 2005, 5 Pages.

Kress, et al., "Enterprise Service Bus", Retrieved From: <<http://www.oracle.com/technetwork/articles/soa/ind-soa-esb-1967705.html>>, Jul. 2013, 12 Pages.

Moghaddam, Mahboobeh "An Auction-based Approach for Composite Web Service Selection", In Proceedings of the International Conference on Service-Oriented Computing, Nov. 12, 2012, 6 Pages.

Wang, et al., "Effective Web Service Selection via Communities Formed by Super-Agents", in Journal of IEEE/WIC/ACM International Conference, vol. 1, Aug. 31, 2010, 8 Pages.

* cited by examiner

BOT NETWORK ORCHESTRATION TO PROVIDE ENRICHED SERVICE REQUEST RESPONSES

BACKGROUND

An increasing number of Internet robots, hereinafter bots, become available each day that perform automated tasks over the Internet to help facilitate a variety of everyday service requests for a user, such as setting up travel plans, booking appointments, ordering food or clothing, and the like. However, with the increase in number also comes an increase in usage complexity for users. For example, users may not know which bots may be relevant to their requests. Accordingly, the users may be receiving less enriched and personalized responses than possible if all of the relevant bots had been determined and orchestrated.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an orchestration service configured to perform bot network orchestration. For example, a service request for a user may be received, where the service request may involve at least one service provider. A plurality of bots to orchestrate a processing of the service request may be determined. Instructions may be provided to the plurality of bots associated with aspects of the service request, where each bot is selected based on an aspect of the service request. Responses may be received from the plurality of bots associated with the aspects of the service request, the received responses may be integrated into a service response, and the service response may be provided to a requestor of the service request.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
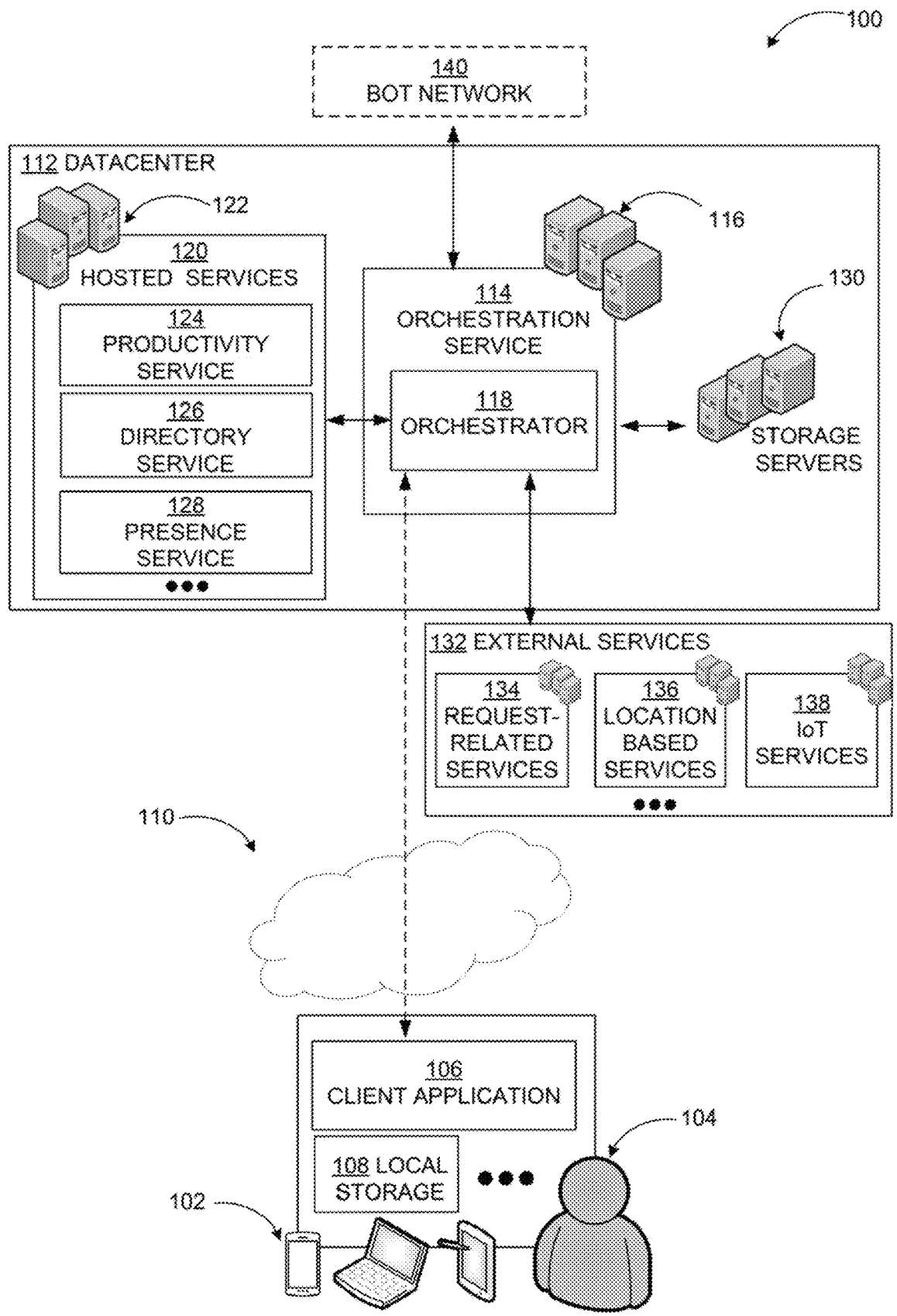
FIG. 1 includes a display diagram illustrating an example network environment where a system executing an orchestration service to perform bot network orchestration may be implemented.

As briefly described above, embodiments are directed to an orchestration service configured to perform bot network orchestration in order to provide enriched responses to service requests and/or in order to find one accurate answer among large numbers of bot responses to a specific query. For example, the orchestration service may receive a service request for a user, where the service request may involve at least one service provider. For example, the service request may be related to travel, shopping, and/or general information gathering, among other service requests. The orchestration service may determine a plurality of bots to orchestrate a processing of the service request. The orchestration service may provide instructions to the plurality of bots associated with aspects of the service request, where each bot may be selected based on an aspect of the service request. The aspect of the service request may be a service type, a service location, a service time or duration, or service preferences of the user, for example. Additionally, because the determination of the plurality of bots to orchestrate the processing of the service request may be iterative, the aspect of the service request may also be a response or an aspect of the response from a bot that was previously selected to orchestrate the processing of the service request. Thus, additional bots may be selected based on the response of a previously selected bot. The orchestration service may then receive responses from the bots, integrate the received responses into a service response, and provide the service response to a requestor of the service request.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for executing an orchestration service configured to perform bot network orchestration. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes a display diagram illustrating an example network environment where a system executing an orchestration service configured to perform bot network orchestration may be implemented.

As illustrated in a diagram 100, an example system may include a datacenter 112 executing an orchestration service 114 on at least one processing server 116. The orchestration service 114 may include an integrated orchestrator 118, which may be configured to perform bot network orchestration in order to provide enriched responses to service requests. The orchestration service 114 may be configured to interoperate with a client application 106 through one or more client devices 102 over one or more networks, such as network 110. The client devices 102 may include a desktop computer, a laptop computer, a tablet computer, a vehicle-mount computer, a smart phone, or a wearable computing device, among other similar devices. In some examples, the orchestration service 114 may be public and allow a user 104 to access its services through the client application 106 executed on the client devices 102. In other examples, the orchestration service 114 may be provided to a tenant (e.g., an enterprise), which may configure and manage the services for their users. In such an enterprise scenario, service responses provided in response to a service request may be controllable by an administrator. As described herein, the orchestration service 114 and the orchestrator 118 may be implemented as software, hardware, or combinations thereof.

In some embodiments, the orchestration service 114 may be configured to interact with hosted services 120 associated with the user 104 in order to obtain user information. The hosted services 120 may be executed on at least one processing server 122 of the datacenter and may include services such as a productivity service 124, a directory service 126, and a presence service 128, among other similar services that provide user information. For example, the orchestrator 118 may query the at least one processing server 122 on which the hosted services 120 are executed to obtain user preferences, user location, and/or the user's schedule. The user preferences may be based on a search history of the user, a browsing history of the user, a communication history of a user, an employee profile of the user, a social or professional network profile of the user, and/or preferences retrieved from a third party service, among other examples. In an example scenario, the orchestrator 118 may query a calendar of the user 104 associated with the productivity service 124 to obtain the user's upcoming schedule availability, as well as user preferences of times and/or locations to conduct certain activities based on past events within the calendar.

The orchestration service 114 may also be configured to interact with services external to the datacenter 112. For example, a set of application programming interfaces (APIs) may enable the external services 132 to communicate with one another and the orchestrator 118. The external services 132 may include request-related services 134, location based services 136, and/or Internet-of-things (IoT) services 138, among other examples. The orchestration service 114 may want to retrieve information from these external services 132 on the front end regarding the respective services offered before later querying the services in more detail upon receipt of a service request to avoid potentially paying money or losing time waiting on a response.

In one example, this may be accomplished by querying a bot associated with the external services 132 to obtain the desired information. Additionally and/or alternatively, the orchestration service 114 may include a central registry that stores a contract from providers of each of these services, where the contract indicates what each service provider may accept as inputs and what they can provide as outputs regarding their services. The inputs and outputs may be what the service provider can accept and provide on a persistent basis or the inputs and outputs may be based on a service request by service request basis. The orchestration service 114 may then generate a list of inputs and outputs based on the contract received from each service provider. Some of the service providers may have restrictive access to their services. These service providers, as part of the contract, may provide a set of user groups or user account identifiers that are allowed to use their service. Alternatively, user account information may be included in the service request, so that the service provider can accept or refuse the request. Other service providers may be accessible to any user, in which case no user account information is required. Additionally, as part of the contract, the service providers may provide a cost and/or a response time of their services to the orchestration service 114, which may be utilized to provide an optimal service response to the user 104, as discussed below. Alternatively, this information regarding service call costs and response times may be obtained from bots associated with the respective service providers that forward the information to the orchestration service 114 and/or from dedicated bots for accessing bot-directories. In some embodiments, the service providers may choose to financially reward the orchestration service 114 if their services are booked through implementation of the orchestration service 114, and thus the orchestration service 114 may select service providers to maximize revenue.

In an example embodiment, the orchestrator 118 may receive a service request for the user 104, where the service request may involve at least one service provider. In this example, the user 104 may be a human user requesting the service. However, in other examples the user may be a non-human user, such as a bot. In an example scenario, the service request may be to book a full travel itinerary including transport, lodging, and activities to a new city, where a travel service may act as a virtual travel agent. In another example scenario, the service request may be to purchase all back-to-school items needed for a child, where an online purchase service may act as a virtual personal shopper. In a further example scenario, the service request may be to query for all published research articles associated with a particular area of medicine, where an information service may act as a virtual research assistant. The service request may be received from an intermediary service provider being utilized by the user 104, such as the travel service, the online purchase service, or the information service. Other example service providers may include a banking service, a financial service, a trading service, a real estate service, a healthcare provider service, or a maintenance service, among many other similar services. Alternatively, the service request may be received directly from the user 104 through the client application 106.

The orchestrator 118 may determine a plurality of bots to orchestrate a processing of the service request. The bots may include custom bots for one or more services registered with the orchestration service 114, such as the request-related services 134 and/or location based service 136. In some examples, a custom bot may be associated with a particular service entity or a custom bot may be associated with service categories as a whole. The bots may also include custom bots for one or more service aspects of the service request, such as a service type, a service location, a service time or duration, and service preferences. For example, a custom bot may be associated with services in the Pacific Northwest (i.e., a service location). Additionally, because the determination of the plurality of bots to orchestrate the processing of the service request may be iterative, an aspect of the service request may also be a response or an aspect of the response from a bot that was previously selected to orchestrate the processing of the service request. Thus, a bot may be selected based on the response of a previously selected bot. The bots may also include operation-based bots to perform one or more tasks such as aggregation, filter, search, and/or further lookup. The bots may further include general purposes bots. In some embodiments, the orchestration service 114 may be integrated with a separate, already established bot network 140 in order to form a comprehensive network. In additional embodiments, the orchestrator 118 may provide one or more general purpose bots to third party services for customization and connection with the bot network, as described in greater detail in conjunction with FIG. 5.

The orchestrator 118 may provide instructions to the plurality of bots associated with aspects of the service request, where each bot may be selected based on an aspect of the service request. In some embodiments, custom bots may be initially selected to enable more refined responses to the service request, followed by a selection of more general purpose or operation-based bots (e.g., search and further look up operation-based bots) if the responses need to be expanded. In other embodiments, general purpose bots may be initially selected to return all possible responses based on the aspects of the service request, and then the operation-based bots (e.g., filter operation-based bots) may be selected to filter the responses based on the user information, for example. The filtered responses may then be optionally provided to general purpose bots as new service requests, where the filtered responses may be included as aspects of the new service requests. In further embodiments, bots may be selected along with other types of web based services. For example, a custom sales bot may be selected in conjunction with a traditional web based weather service in response to a service request to purchase an umbrella.

Continuing with the above-provided examples, if the service request is to book a full travel itinerary to a new city including transport, lodging, dining, and activities as service type aspects, bots associated with transportation, lodging, restaurant, and tourism services may be selected. Additionally, bots associated with the city or a larger area encompassing the city may be selected based on the service location aspect. As discussed above, one or more bots may be selected for each aspect of the service request, where some selected bots may be associated with multiple aspects of the service request, such as both transport and lodging service type aspects. Some of the bots may be associated with a particular entity, such as a bot for a particular airline or hotel chain, while other bots may be associated with service categories as a whole, and as such may produce responses for various airlines or hotel chains. In the other provided example, if the service request is to purchase all back-to-school items needed for a child, bots associated with apparel services, footwear services, and office supply services may be selected. In the further provided example, if the service request is to submit a query for all published research articles associated with a particular area of medicine, bots associated with research databases, journal databases, and other similar services may be selected.

The instructions provided by the orchestrator 118 to each bot may include a list of inputs based on the respective aspects of the service request. The list of inputs may also be based on the user information. For example, in the back-to-school scenario, the inputs provided to a bot associated with a particular office supply service may include an office supply service type, a service preference for the cheapest available brand, and a list of office supply items needed, which may be obtained from an email message within a communication service of the user 104 that is associated with the productivity service 124.

The outputs produced from the bots represent the services available that match the list of inputs included within the instructions. The outputs may be provided as responses to the orchestrator 118. In some examples, based on the responses received, the orchestrator 118 may be configured to employ the bots to negotiate an offer with a service. In an example scenario, the responses returned by the bots may include two different services that are providing a same service type at varying costs. The orchestrator 118 may instruct the bots to negotiate an offer with the higher cost service to try to minimize the cost and/or receive a counteroffer. The bots may negotiate the offer with a bot associated with the service or a server associated with the service, for example. The orchestrator 118 may then determine whether to provide a negotiated offer obtained by the bots to the user 104 based on the service preferences provided within the service request, service preferences determined by employing machine learning techniques as described in the following paragraph, and/or the user information.

The orchestrator 118 may integrate the received responses into a service response, and provide the service response to a requestor of the service request. In one example, if the user 104 is interacting with the orchestration service 202 through an intermediary service provider (i.e., the requestor is the intermediary service provider), the service response may be provided to a bot, a webpage, or a web service associated with the intermediary service provider. The intermediary service provider may then render the service response for display to the user 104. Alternatively, the requestor may be the user 104 directly interacting with the orchestrator 118 through the client application 106, and thus the response may be provided to the client application 106. In some embodiments, during the integration process, the orchestrator 118 may be configured to employ machine learning techniques to determine service preferences for the user 104 based on past experience. These determined service preferences may be in addition to those service preferences provided in the service request. For example, in a travel-related service request the user 104 may indicate a preference for the cheapest travel route from an origin to destination location, and based on machine learning, the orchestrator 118 may further determine a service preference of the fastest travel route. Based on a level of confidence associated with the determined service preferences, the orchestrator 118 may automatically provide the service response based on the service preferences. For example, if the two cheapest travel routes found are the same cost, but one is faster than the other, the orchestrator 118 may automatically provide the faster travel route. Alternatively, the orchestrator 118 may provide multiple service response options to the requestor for selection. In some examples a suggested selection based on the one or more service preferences may be indicated among the multiple service response options through graphical schemes, such as highlighting, shading, and animation, audible schemes, and/or tactile schemes, among other similar schemes. For example, the orchestrator 118 may provide both of the cheapest travel routes while highlighting the faster route to indicate a suggested selection.

In some examples, if a threshold level of confidence associated with the determined service preferences is met, the orchestrator 118 may automatically perform an action associated with the service response. For example, continuing with the examples initially provided, the orchestrator 118 may automatically book a flight in the travel based scenario, may automatically purchase a piece of clothing in the shopping based scenario, or may automatically purchase an article for download in the research based scenario, if the threshold level of confidence associated with the determined service preferences is met. The orchestrator 118, through the orchestration service 114, may then be configure to communicate with one or more of the hosted services 120 to indicate the action performed to the user. Example machine learning approaches may include, but are not limited to, linear regression, logistic regression, decision tree, various Bayesian algorithms, K-means, neural networks, and random forest. Further machine learning approaches may include, but are not limited to, case-based reasoning, rule-based systems, artificial neural networks, genetic algorithms, cellular automata, fuzzy models, multi-agent systems, swarm intelligence, reinforcement learning and hybrid systems.

In some embodiments, the orchestrator 118 may further analyze the service response to improve accuracy, update user preferences, update service preferences, offer additional services, and/or collect statistical information. Additionally, the orchestrator 118 may be further configured to dynamically modify the service response based on feedback from the IoT services 138. The IoT services 138 may facilitate the inter-networking of physical devices, vehicles (also referred to as "connected devices" and "smart devices"), buildings, and other items embedded with electronics, software, sensors, actuators, and network connectivity which enable these objects to collect and exchange data.

Service aspects and instructions associated with the service requests, bot responses and the service response to the service request, service preferences determined via machine learning techniques, and the user information may be stored locally in local storage 108 of the client devices 102 and/or remotely in storage servers 130 of the datacenter 112. The storage servers may be configured to execute a database and/or a cloud-based storage service, among other storage examples. In an example embodiment, the instructions provided to the bots may be stored in the database such that each service registered with the orchestration service 114 can read and/or write the instructions, may be stored in a file sent between each service such that each service can read, write, and/or append to the file, and/or may be stored in the cloud-based storage service such that each service may perform a call to the cloud-based storage service instructing it to add or modify contents of the instructions.

As previously discussed, an increasing number of bots become available each day that perform automated tasks over the Internet to help facilitate a variety of everyday service requests. However, an increase in usage complexity has accompanied the increase in number. As a result, users may be receiving less enriched responses to their service requests because they do not know which bots and/or services may be relevant to their requests. Thus, embodiments, as described herein, are directed to an orchestration service configured to perform bot network orchestration in order to provide enriched responses to service requests. The bot network orchestration reduces the amount of processing and reduces the network bandwidth required to return responses to a service request. Additionally, the enriched service responses returned as a result of the bot network orchestration increases user interaction and efficiency when requesting services.

The presence of the bot network orchestration may be detected based on a richness level of the service response. For example, a non-orchestrated network of bots typically provide more limited and focused responses to a service request. However, as described in the embodiments herein, the user may provide minimal information in the service request and receive a much richer response due to the bot network orchestration, which takes advantage of the breadth of available information on the Internet while considering contextual user information to provide the most optimal service response to the user.

Embodiments, as described herein, address a need that arises from a very large scale of operations created by software-based services that cannot be managed by humans. The actions/operations described herein are not a mere use of a computer, but address results of a system that is a direct consequence of software used as a service offered in conjunction with a large number of bots to help facilitate a variety of service requests.

Figure 2:
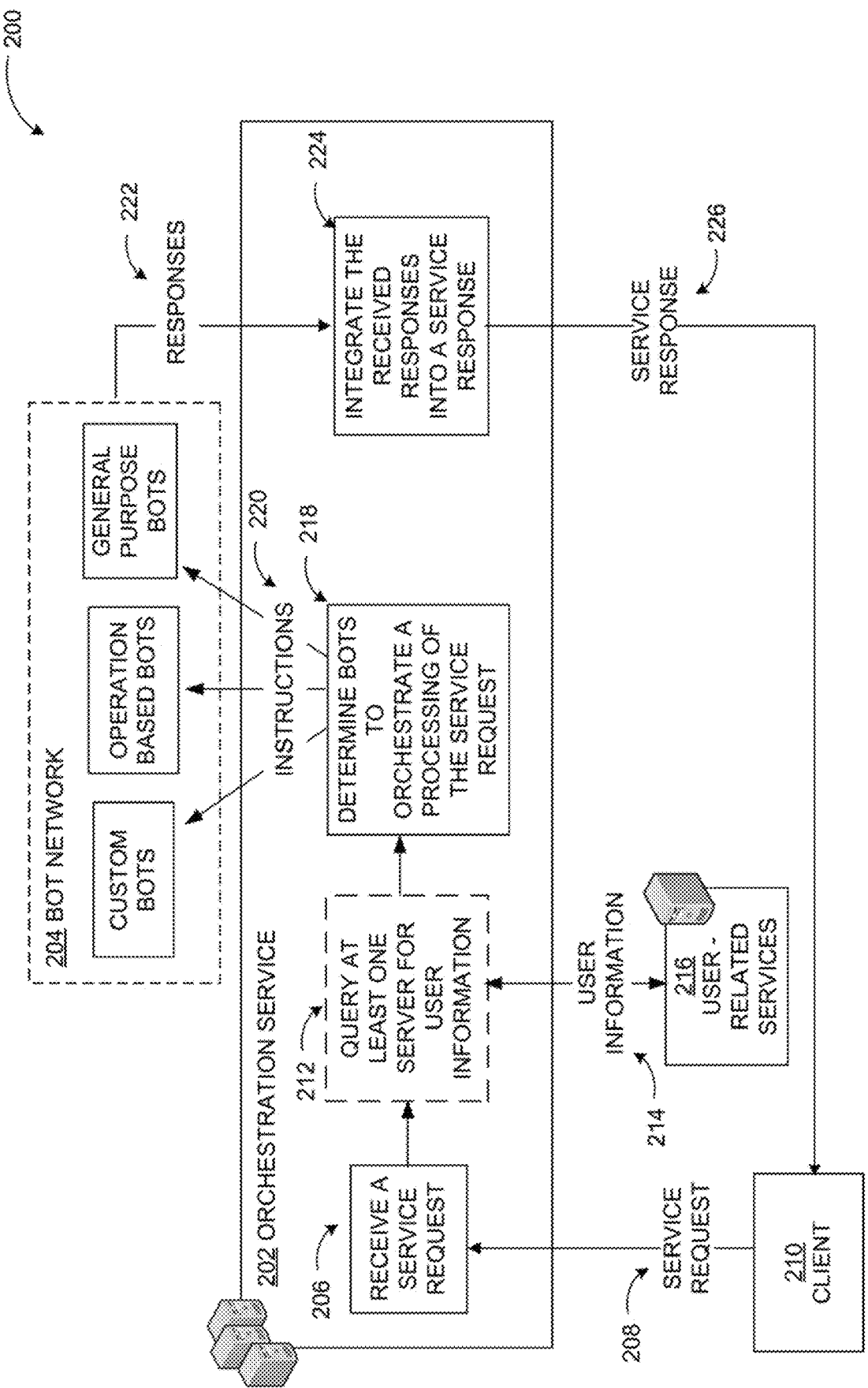
FIG. 2 includes a display diagram conceptually illustrating a method to perform bot network orchestration in order to provide an enriched service response to a service request.

FIG. 2 includes a display diagram conceptually illustrating a method to perform bot network orchestration in order to provide an enriched service response to a service request. As shown in a diagram 200, an orchestration service 202 may be configured to orchestrate a bot network 204. The bot network 204 may include a variety of bots, such as custom bots, operation-based bots, and general purpose bots. In an example embodiment, at operation 206, the orchestration service 202 may receive a service request 208 for a user directly from a thick or a thin client application executed on a client device of the user ("client") 210, for example. In another embodiment, the service request 208 may be received from a server associated with an intermediary service provider the user is interacting with through the client 210, such as a travel service, an online purchaser service, an information service, a banking service, a financial service, a trading service, a real estate service, a healthcare provider service, or a maintenance service, among many other examples. In a further embodiment, the orchestration service 202 may receive a service request for a non-human user, such as a bot.

At optional operation 212, the orchestration service 202 may be configured to query at least one server for user information 214. As illustrated, the orchestration service 202 may query user-related services 216 to obtain the user information 214. The user-related services 216 may include a productivity service, a directory service, and/or a presence service associated with the user, among other similar services that provide user-based information. The user information 214 may include user preferences, a location of the user, and a schedule of the user, for example. The user preferences may be based on a search history of the user, a browsing history of the user, a communication history of a user, an employee profile of the user, a social or professional network profile of the user, and/or preferences retrieved from a third party service, among other examples. Alternatively, user information or preferences may be included within the service request.

At operation 218, the orchestration service 202 may be configured to determine a plurality of bots from the bot network 204 to orchestrate the processing of the service request 208. For example, the orchestration service 202 may select the bots based on one or more aspects of the service request 208. The aspects of the service request may include a service type, a service location, a service time or duration, and/or service preferences. Additionally, because the determination of the plurality of bots to orchestrate the processing of the service request may be iterative, the aspect of the service request may also be a response or an aspect of the response from a bot that was previously selected to orchestrate the processing of the service request. Thus, additional bots may be selected based on the response of a previously selected bot.

One or more bots may be selected for each aspect of the service request 208, where some of the selected bots may be associated with multiple aspects of the service request 208. Additionally, the orchestration service 202 may select the bots based on the user information 214 if it is obtained. Some of the selected bots may be associated with a particular service entity, while other selected bots may be associated with service categories as a whole. In one embodiment, the custom bots may be initially selected to enable more refined responses to the service request, followed by a selection of more general purpose or operation-based bots (e.g., search and further look up operation-based bots) if the responses need to be expanded. In another embodiment, general purpose bots may be initially selected to return all possible responses, and then the operation-based bots (e.g., filter operation-based bots) may be selected to filter the responses based on the user information, for example.

The orchestration service 202 may be configured to provide instructions 220 to the bots selected. The instructions may include a set of inputs based on the aspects of the service request 208 and the user information 214. The bots may be configured to take the set of inputs and produce outputs that represent the services available that match the set of inputs included within the instructions. The outputs may be provided to the orchestration service 202 as responses 222. Once received, the orchestration service 202 may be configured to integrate the received responses into a service response 226 at operation 224. The orchestration service 202 may then provide the service response 226 to the client 210. Alternatively, if the user is interacting with the orchestration service 202 through an intermediary service provider, the service response may be provided to a bot, a webpage, or a web service associated with the intermediary service provider. The intermediary service provider may then render the service response for display to the user. In some examples, the service response 226 may be a single service response provided to the client 210. In other examples, the service response 226 may be multiple service response options provided to the client 210 for the user to select, where a suggested selection may be indicated. In some embodiments, as described in detail in conjunction with FIG. 1, the orchestration service 202 may be configured to perform additional operations to provide a further enriched, personalized service response to the client, such as employing machine learning techniques and/or negotiations, among other examples.

Figure 3:
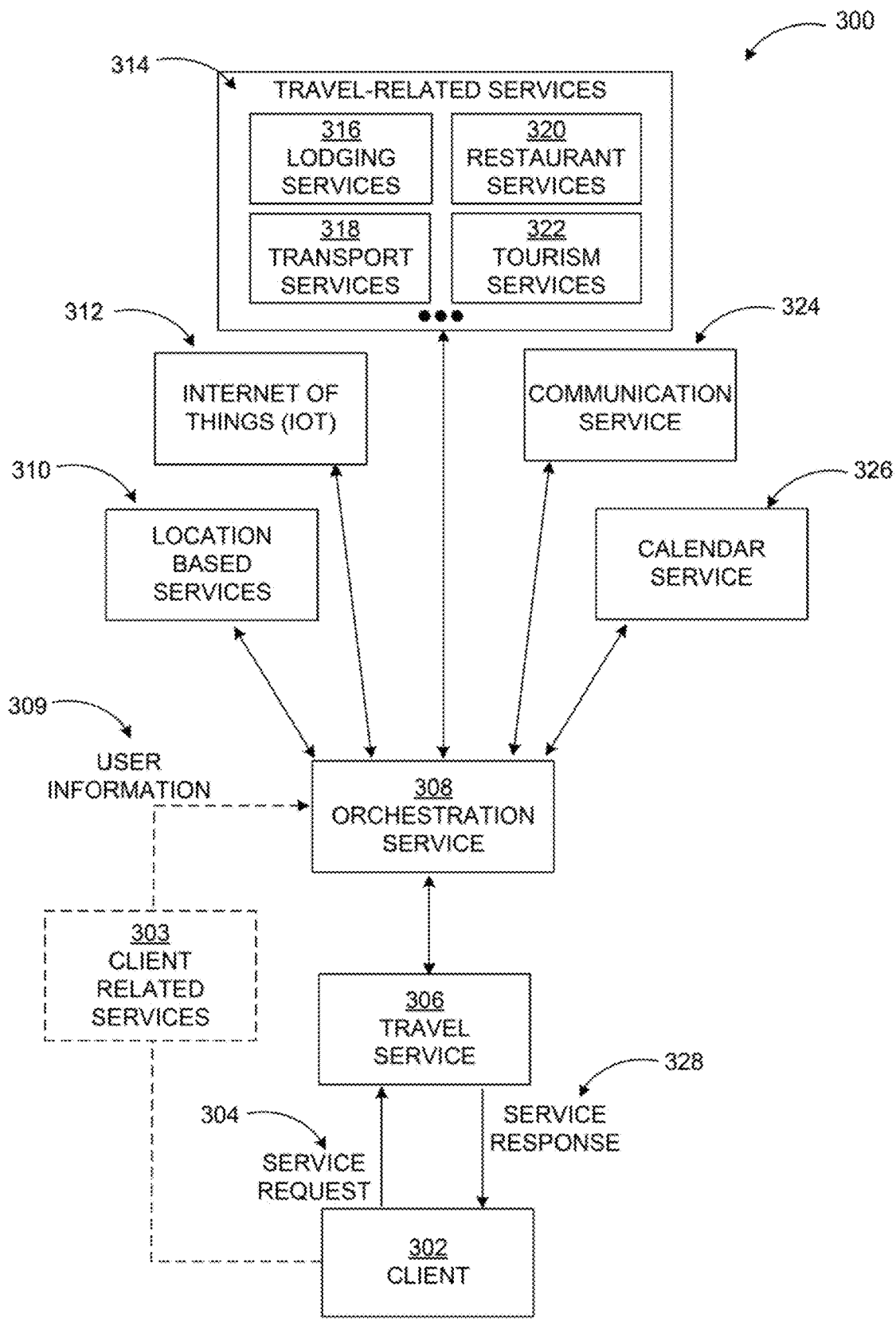
FIG. 3 includes a display diagram illustrating an example scenario where an orchestration service may be implemented to perform bot network orchestration in order to provide an enriched service response to a travel-related service request.

FIG. 3 includes a display diagram illustrating an example scenario where an orchestration service may be implemented to perform bot network orchestration in order to provide an enriched service response to a travel-related service request.

As shown in a diagram 300, a user may input a service request 304 to plan and book a travel itinerary to a desired destination, such as a city, to attend a conference. The service request 304 may include various aspects such as one or more service types, service locations, service times or durations, and service preferences. The user may input the service request 304 through an intermediary service provider, such as a travel service 306. The travel service 306 may be a service that the user 302 accesses through a thick or a thin client application executed on a client device of the user ("client") 302, for example. The travel service 306 may retrieve data responsive to the service request 304 from an orchestration service 308 in order to provide a service response 328, where the orchestration service 308 may perform bot network orchestration in order to enrich the service response 328.

The orchestration service 308 may optionally query at least one server executing client-related services 303 for user information 309 including user preferences, user location, and user schedule. The user preferences may be based on a search history of the user, a browsing history of the user, a communication history of a user, an employee profile of the user, a social or professional network profile of the user, and/or preferences retrieved from a third party service, among other examples. For example, the user information 309 may indicate the current location of the user, which is a necessary input for booking various modes of transport from the user's current location to the desired destination. The user information 309 may also indicate which days and times the user has available to participate in activities outside of the conference. Alternatively, user information may be included as service preferences within the service request, for example.

A set of APIs may allow the travel service 306, the location based service 310, and the travel-related services 314, to communicate with one another and the orchestration service 308. The orchestration service 308 may include a central registry that stores a contract from the providers of each of these services, where the contract indicates what each service provider may accept as inputs and what they can provide as outputs regarding their services on either a persistent or service request by service request basis. The orchestration service 308 may generate a list of inputs and outputs based on the contract received from each service provider.

The orchestration service 308 may determine a plurality of bots to orchestrate a processing of the service request 304. The bots may include general purposes bots, custom bots for services registered with the orchestration service 308 (e.g., the travel service 306, the location based service 310, and the travel-related services 314), custom bots for service aspects of the service request 304, and/or operation-based bots for tasks to be performed, such as aggregation, filter, search, and further lookup. Each bot may be selected based on an aspect of the service request and based on user information 309. For example, the service request 304 may include service type aspects related to transportation, lodging, food, and tourism and service location aspects related to the city, and thus bots may be selected to ensure each of those aspects of the service request 304 is responded to. Accordingly, the bots selected may be associated with the travel-related services 314 and the location based services 310. The travel-related services 314 may include lodging services 316, transport services 318, restaurant services 320, and tourism services 322, among other similar services.

The orchestration service 308 may provide instructions to each selected bot, which may include a list of inputs based on the respective aspects of the service request 304 and based on the user information 309. The outputs produced from the bots represent the services available that match the list of inputs included within the instructions.

In an example embodiment, bots associated with the transport services 318 may provide a variety of options for getting to and around the city as output, such as flights, trains, buses, rental cars, and/or other transportation services, based on origin and target locations, travel dates, travel times, cost limitations, etc. as indicated within the list of inputs. Bots associated with the lodging services 316 may provide a variety of options for the user to stay at when he or she is in the city as output, such as hotels, bed and breakfasts, hostels, apartment and home rentals, and other similar hospitality services, based on dates, cost limitations, lodging style preferences, etc. indicated within the list of inputs. Bots associated with the restaurant services 320 may provide a variety of restaurant choices as output based on a type of food, a location of the restaurant, a cost of the food, hours of operation, etc. indicated by the list of inputs. Bots associated with the tourism services 322 may provide activities to do in the city, where the bots may provide activities based on duration and user preferences obtained from the client related services 303, such as a calendar service. In an example scenario, if the user enjoys cultural activities determined based on past activities/events attended and there is a duration of 1 hour free in the user's calendar, the bots may identify a museum that average users have typically only spent an hour at as output.

Other operation-based bots may perform tasks, such as aggregation, filter, search, and/or further lookup, based on the outputs provided by the bots. For example, a bot may receive the output provided by the bots associated with the transport services 318 as described in the example above, and filter the output based on the user information 309. In one example scenario, the user may be a rewards member of a certain airline, and thus the filter bot may remove any output for flights not associated with this certain airline from the response. In another example scenario, the user may indicate a service preference of the cheapest route within the service request, and thus the filter bot may refine the output to indicate only the least expensive mutes. If an additional user is traveling with the user and the additional user has different preferences, such as a preference over a faster route, the filter bot may accommodate both preferences when filtering.

In some embodiments, the orchestration service 308 may be configured to determine a plurality of bots to orchestrate a processing of a service request for multiple users operating together. In the travel example, if a group of friends or a family were travelling together, the orchestration service 308 may take into consideration information associated with each member of the group or family when selecting bots. For example, if the orchestration service 308 knew from user preferences or machine learning of user behavior that some users favor football matches and others favor museum visits, the orchestration service 308 may indicate these preferences within the list of inputs provided to the bots associated with the tourism services 322 such that the service response, an itinerary, has activities that all of the users would enjoy. Additionally and/or alternatively, the orchestration service 308 may provide different service responses (i.e., different itineraries) for each member of the group or family based on their individual preferences, while ensuring key elements, like flights and lodging, remain the same and potentially ensuring all group members get to meet at some point each day.

In response to the instructions from the orchestration service 308, the bots may return no response, one response, or more than one response. Additionally, different bots may return different results of the same type in response to the same instructions. The orchestration service 308 may then take each response and search for additional services on each result, which generates another set of responses for each request 304. For example, the user may want to go to a museum and a pub while they are in the city. Bots associated with the tourism services 322 and/or location based services 310 may identify a museum at one side of the city and a pub at the other side of the city. The user may either go to the museum first or to the pub first. In either scenario, the user will have to travel between both locations. Thus, the orchestration service 308 may provide instructions for one or more of the bots to identify a footpath, rental car, bike, tram, bus or metro, among other similar means of transport, to travel between both locations (e.g., each transport type may be identified by a different bot). Instructions may be provided for both combinations, first museum and first pub.

Once responses from the bots have been received, the orchestration service 308 may integrate the received responses into a service response 328. During the integration process, machine learning techniques may be employed for determining service preferences of the user based on past experience. These determined service preferences may be in addition to those service preferences provided in the service request 304. For example, if it is learned that the user favors certain options based on past experience (e.g., the user favors bed and breakfasts over hotels), the orchestration service 308 may automatically prioritize the favored option in the service response 328. Depending on a level of confidence in the favored option, the orchestration service 308 may choose to automatically provide only the favored option within the service response 328 or use the favored option as another factor in making a determination along with other factors such as timing, duration, etc. If the level of confidence is not high, or even if there is a high level of confidence, the orchestration service 308 may alternatively provide all of the service response options in the service response. Optionally, the suggested or favored service response option may be indicated among all of the provided service response option through graphical schemes, such as highlighting, shading, and animation, audible schemes, and/or tactile schemes, among other similar schemes.

In some embodiments, especially when there is a high level of confidence in the favored option, the orchestration service 308 may choose to automatically book the favored option. For example, if based on past experience, it is known that the user typically flies a particular airline when they fly from an origin location to a destination location and they have a preference for a cheapest route, the orchestration service 308 may automatically book a flight received in the responses from the bots if the flight is serviced by that particular airline and is the cheapest available from the origin location to the destination location. In some embodiments, the orchestration service 308 may also determine whether or not to automatically book the flight based on how much of the fare is refundable if cancelled. In further embodiments, the orchestration service 308 may automatically book the flight if a reply has not been received by the user regarding the flight within a particular time period in order to avoid fare increases due to late bookings. The orchestration service 308 may then be configured send an email message that includes confirmation numbers and other flight information to a communication service 324 associated with the user and/or add the flight information/duration to the user's calendar through a calendar service 326 associated with the user.

Machine learning may further be employed across multiple system users to determine user preferences. This may be implemented for all users to infer information, such as a general service preference of minimal travel times among users. Alternatively, it may be implemented for a subset of users, such as those travelling to a particular city where certain activities may typically be favored by travelers. Example machine learning approaches may include, but are not limited to, linear regression, logistic regression, decision tree, various Bayesian algorithms, K-means, neural networks, and random forest. Further machine learning approaches may include, but are not limited to, case-based reasoning, rule-based systems, artificial neural networks, genetic algorithms, cellular automata, fuzzy models, multi-agent systems, swarm intelligence, reinforcement learning and hybrid systems.

The service response 328 may then be provided by the orchestration service 308 to the travel service 306, which may then render the service response 328 for display through the client 302. To minimize cost, the orchestration service 308 may automatically allocate how many variations of the service request 304 should be run automatically to produce the service response 328. A manual instruction that triggers more variations of the service request 304 to be run may also be provided so that the user can be provided additional options within the service response 328 if desired. The service response 328 may be cached by a service in the network, such as a storage service, to prevent repeated calls to service routes in the network.

As part of the contract provided by the service providers upon registering with the orchestration service 308, the service providers may yield information about how much a service call costs. Alternatively, this information regarding service call costs may be obtained from bots associated with the respective service providers that forward the information to the orchestration service 308 and/or from dedicated bots for accessing bot-directories. The orchestration service 308 can use this information in advance to determine the plurality of bots to orchestrate the processing of the service request such that the orchestration service 308 does not waste resources providing instructions to a bot associated with a service that is outside of the user's service preference for cost in the service request. Additionally, the orchestration service 308 can use this information in the integration process to provide options in the service response 328 for the user to select cheaper service routes through the network. For example, even when there is an expensive service call to be made, such as an expensive flight to the city with lower priced transport once within the city, the service route may be cheaper than to use a service route containing medium priced services for each mode of transport (e.g., 1-1-9-1-1 is cheaper than 3-3-3-3-3, where a higher number means a higher cost for the service call). Similar methodology can be applied for other constraints, e.g., service response times, such that the orchestration service 308 can provide options for the user to select the fastest service routes through the network.

In some embodiments, based on the responses received from the bots, the orchestration service 308 may be configured to negotiate offers with a service via the bots, where the bots may negotiate the offer with a bot associated with the service or a server associated with the service. In an example scenario, the user may search for a flight in the service request 304 and the following two responses may be returned by the bots: $200 for the flight through Airline A and $150 for the flight through Airline B. In one embodiment, the orchestration service 308 may automatically provide the cheaper flight from Airline B to the user as the service response 328. Alternatively, the orchestration service 308 may instruct the bots to contact a bot and/or a server associated with Airline A and specify that an offer of $150 has been received to see if Airline A has a better offer available. Negotiation may then proceed until the minimum price is found. In this scenario, it may also be possible for the bot and/or server associated with Airline A to respond with a counter offer of $200 with baggage included, instead of lowering the price. The orchestration service 308 may then determine whether or not to provide a negotiated offer to the user based on aspects of the service request 304 and the user information 309. For example, if a service preference of not checking any baggage was indicated in the service request 304, the orchestration service 308 may not provide the negotiated offer that included baggage instead of a lower price.

In other embodiments, the orchestration service 308 may be combined with IoT services 312. In one example, the orchestration service 308 may provide a recommended itinerary that is provisionally booked. However, based on feedback from the IoT services 312, the itinerary may be dynamically modified based on user information, such as location and schedule, on the day associated with the itinerary. For example, if the user's mobile phone tracking indicates that the user is heading to a bicycle rental rack at the airport instead of the shuttle pickup area, a bicycle may be automatically unlocked and the previously booked shuttle cancelled. Similarly, if the user takes longer in a particular museum than expected, the itinerary for the remainder of the day may be cancelled. Even if the itinerary is not completely changed, integration of the IoT services 312 may be useful for scheduling purposes. For example, once a bot associated with a particular airline servicing the user's flight indicates that the user's flight has landed, the user's phone may be tracked until they approach the airport exit, at which point a transport vehicle is requested. This may reduce costs if the user is delayed with traffic jams, etc. within the airport. By integrating the IoT services 312, the orchestration service 308 may be continually and dynamically considering user preferences and behaviors to achieve the lowest prices or best outcome for the user, for example.

In further embodiments, certain service providers registered with the orchestration service 308 may provide financial rewards if their services are booked through implementation of the orchestration service 308. For example, if the service response 328 provided by the orchestration service 308 suggests for the user to book a flight for a particular airline participating in the reward program, and the user books it through orchestration service 308, a financial reward could be received. Accordingly, the orchestration service 308 may select service providers to maximize revenue, if possible. Alternatively, the orchestration service 308 may also choose to accept no financial reward and instead pass the reward on to the user as a discount. Additionally, some service providers may push up prices if they detect interest in a particular option, e.g., flights between certain cities on particular dates. If this behavior is known to the orchestration service 308, it can choose to cache previous service responses in the network in order to minimize the possibility of artificial price increases.

The orchestration service 308, as described herein, may be used in a variety of contexts. For example, the orchestration service 308 may be public or within an enterprise. If the orchestration service 308 is within an enterprise, service responses may be controllable by an administrator. In an example scenario, service response options exceeding a specific price threshold chosen in accordance with the user's level in the organization or spending limits may be prohibited, and if only expensive options are available, required manager approval is automatically sought out. Other aspects of the orchestration service may also be gated as desired.

Figure 4:
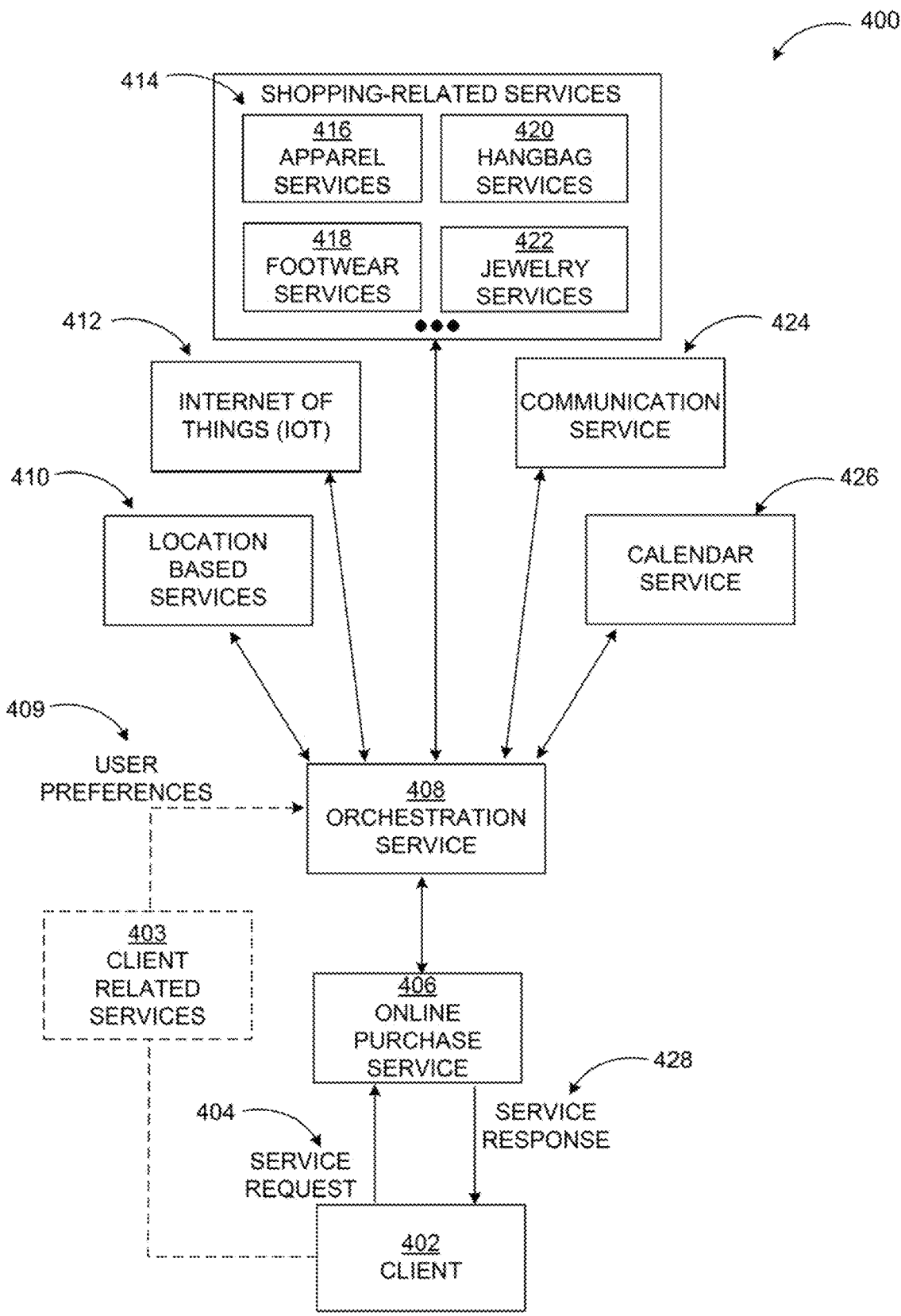
FIG. 4 includes a display diagram illustrating an example scenario where an orchestration service may be implemented to perform bot network orchestration in order to provide an enriched service response to a shopping-related service request.

FIG. 4 includes a display diagram illustrating an example scenario where an orchestration service is implemented to perform bot network orchestration in order to provide an enriched service response to a shopping-related service request.

As shown in a diagram 400, a user may input a service request 404 to be personally styled for a weeklong vacation to a tropical location through an intermediary service provider, such as an online purchaser service 406. The service request 404 may include various aspects such as one or more service types, service locations, service times or durations, and service preferences. The online purchaser service 406 may be a service that the user accesses through a thick or a thin client application executed on a client device of the user ("client") 402, for example. The online purchaser service 406 may retrieve data responsive to the service request 404 from an orchestration service 408 in order to provide a service response 428, where the orchestration service 408 may perform bot network orchestration to enrich the service response 428.

The orchestration service 408 may optionally query at least one server executing client-related services 403 for user information 409. The client-related services 403 may include a productivity service, a directory service, and/or a presence service. The user information obtained may include user preferences, a user location, and user schedule. The user preferences may be based on a search history of the user, a browsing history of the user, a communication history of a user, an employee profile of the user, a social or professional network profile of the user, and/or preferences retrieved from a third party service, among other examples.

For example, the user information 409 may indicate what types of activities the user will participating in during the vacation based on events scheduled within a user's calendar associated with the productivity service. Alternatively, user information may be included as service preferences within the service request, for example.

A set of application programming interfaces may allow the online purchase service 406, the location based services 410, and the shopping-related services 414, to communicate with one another and the orchestration service 408. The orchestration service 408 may include a central registry that stores a contract from the providers of each of these services, where the contract indicates what each service provider may accept as inputs and what they can provide as outputs regarding their services on either a persistent or service request by service request basis. The orchestration service 408 may generate a list of inputs and outputs based on the contract received from each service provider.

The orchestration service 408 may determine a plurality of bots to orchestrate a processing of the service request 404. The bots may include general purposes bots, custom bots for services registered with the orchestration service 308 (e.g., the online purchaser service 406, the location based services 410, and the shopping-related services 314), custom bots for service aspects of the service request 404, and/or operation-based bots for tasks to be performed, such as aggregation, filter, search, and further lookup. Each bot may be selected based on an aspect of the service request 404 and/or based on the user information 409 if it is obtained. For example, the service request 404 may include service type aspects related to apparel, footwear, handbags, and jewelry and service location aspects related to the tropical location, and thus bots may be selected to ensure each of those aspects of the service request 404 is responded to. Accordingly, the bots selected may be associated with the shopping-related services 414 and the location based services 410. The shopping-related services 414 may include apparel services 416, footwear services 418, handbag services 420, and jewelry services 422, among other similar services.

The orchestration service 408 may provide instructions to each selected bot, which may include a list of inputs based on the respective aspects of the service request 404 and based on the user information 409. The outputs produced from the bots may represent the services available that match the list of inputs included within the instructions. The output from the various bots may be provided as responses to the orchestration service 408.

In an example embodiment, custom bots associated with each of the shopping-related services 414 may provide a variety of options for outfits, shoes, handbags, and/or jewelry to wear throughout the vacation as output based on size, type, fabric and/or color preferences, scheduled activities, cost limitations, etc. as indicated within the list of inputs. The custom bots associated with the location-based services 410 may then be configured to refine the outputs of the shopping-related services 414 to ensure that the options provided to the user are appropriate for weather associated with the tropical location. For example, any outer wear such as jackets, scarves, and/or gloves, may be removed. Other operation-based bots may perform tasks, such as aggregation, filter, search, and/or further lookup. For example, a bot may receive the output provided by the bots associated with the apparel services 416 and filter the output further based on the user information 409 or services preferences indicated by the user within the service request 404 through the online purchaser service 406. In one example scenario, the user may indicate through the online purchaser service 406 that they are allergic to a certain type of fabric, and thus a filter bot may remove any output associated with that type of fabric.

In response to the instructions from the orchestration service 408, the bots may return no response, one response, or more than one response. Additionally, different bots may return different results of the same type in response to the same instructions. The orchestration service 408 may then take each response and search for additional services on each result, which generates another set of responses for the service request 404.

Once responses from the bots have been received, the orchestration service 408 may integrate the received responses into a service response 428. During the integration process, the orchestration service 408 may employ machine learning techniques to determine service preferences of the user based on past experience. These determined service preferences may be in addition to those service preferences provided in the service request 404. For example, if it is learned that the user favors certain options based on past experience (e.g., the user favors sandals over high heels), the orchestration service 408 may automatically prioritize the favored option in the service response 428. Depending on a level of confidence in the favored option, the orchestration service 408 may choose to automatically provide only the favored option within the service response 428 or use the favored option as another factor in making a determination along with other factors such as timing, duration, etc. If the level of confidence is not high, or even if there is a high level of confidence, the orchestration service 408 may provide all of the service response options within the service response 428. Optionally, the suggested or favored service response option may be indicated among all of the provided service response options through graphical schemes, such as highlighting, shading, and animation, audible schemes, and/or tactile schemes, among other similar schemes.

In some embodiments, especially when there is a high level of confidence in the favored option, the orchestration service 408 may choose to automatically purchase the favored option when that option can later be returned at no extra charge, for example. For example, if based on past experience, it is known that the user typically purchases a specific brand of sandals in size 7 in neutral colors, the orchestration service 408 may choose to automatically purchase a pair of sandals received in the responses from the bots if those sandals are in black in a size 7. In some embodiments, the orchestration service 408 may also automatically purchase the sandals if a reply has not been received by the user regarding the purchase within a specific period of time to avoid having the sandals sell out before the user can purchase them. The service may take into account attributes such as whether the sandals are returnable, etc. The orchestration service 408 may then be configured to send an email message that includes purchase order numbers and other information, such as shipping information, to a communication service 424 associated with the user and/or add the expected arrival date based on the shipping information to the user's calendar through a calendar service 426 associated with the user.

Machine learning may further be employed across multiple system users to determine user preferences. This may be implemented for all users to infer information, such as users generally prefer larger handbags to be able to carry more items. Alternatively, it may be implemented for a subset of users, such as those travelling to the particular tropical destination where certain styles of dress may typically be favored by travelers. Example machine learning approaches may include, but are not limited to, linear regression, logistic regression, decision tree, various Bayesian algorithms, K-means, neural networks, and random forest. Further machine learning approaches may include, but are not limited to, case-based reasoning, rule-based systems, artificial neural networks, genetic algorithms, cellular automata, fuzzy models, multi-agent systems, swarm intelligence, reinforcement learning and hybrid systems.

The service response 428 may then be provided by the orchestration service 408 to the online purchaser service 406, which may then render the service response 428 for display through the client 402. To minimize cost, the orchestration service 408 may automatically allocate how many variations of the service request 404 should be run automatically to produce the service response 428. A manual instruction that triggers more variations of the service request 404 to be run may also be provided so that the user can be provided additional options within the service response 428 if desired. The service response 428 may be cached by a service in the network, such as a storage service.

As part of the contract provided by the service providers upon signing into the central registry, the service providers may yield information about how much a service call costs. Alternatively, this information regarding service call costs may be obtained from bots associated with the respective service providers that forward the information to the orchestration service 408 and/or from dedicated bots for accessing bot-directories. The orchestration service 408 can use this information in determining the plurality of bots to orchestrate the processing of the service request so that the orchestration service 408 does not waste resources providing instructions to a bot associated with a service that is outside of the user's service preference for cost in the service request. Additionally, the orchestration service 408 can use this information in the integration process to provide options in the service response 428 for the user to select clothing, shoe, handbag, and/or jewelry options that are within the user's price range. For example, even when there is an ensemble comprised of clothing, shoes, a handbag, and jewelry where one of the ensemble items may be very expensive, it may still be cheaper than to create an ensemble containing all medium priced items (e.g., 1-1-9-1-1 is cheaper than 3-3-3-3-3, where a higher number means a higher cost for the ensemble). Similar methodology can be applied for other constraints, e.g. service response times, such that the orchestration service 408 can provide options for the user to select the items that are immediately available and will be shipped to them the quickest.

In some embodiments, based on the responses received from the bots, the orchestration service 408 may be configured to negotiate offers with a service via the bots, where the bots may negotiate the offer with a bot associated with the service or a server associated with the service. In an example scenario, the user may search for a specific brand and color of cocktail dress in the service request 404 and two responses may be returned by the bots: $100 for the dress through clothing store A and $85 for the dress through clothing store B. In one embodiment, the orchestration service 408 may provide the cheaper dress from clothing store B to the user as the service response 428. Alternatively, the orchestration service 408 may contact a bot or a server associated with clothing store A and specify that an offer of $85 has been received to see if clothing store A has a better offer available. Negotiation may then proceed until a minimum price is found. In this scenario, it may also be possible for the bot or server associated with clothing store A to respond with a counter offer of $100 with free shipping and returns/exchanges at no charge included instead of lowering the price. The orchestration service 408 may determine whether or not to provide a negotiated offer to the user based on the user information 409. For example, if the user information indicates a user preference of clothing store A, the orchestration service 408 may provide the negotiated offer.

In other embodiments, the orchestration service 408 may be combined with IoT services 412. In one example, the orchestration service 408 may provide a recommended ensemble for each day of the vacation that is provisionally purchased. However, based on feedback from the IoT services 412, the purchase order may be dynamically modified based on user preferences and/or activities for the vacation. For example, if the user purchases tickets through the client 402 for a snorkeling adventure, the ensemble may be modified to include a swimsuit. By integrating the IoT services 412, the orchestration service 408 may be continually and dynamically considering user preferences and behaviors to achieve the best outcome for the user, for example.

In further embodiments, certain service providers registered with the orchestration service 408 may provide financial rewards if their services are booked through implementation of the orchestration service 408. For example, if the service response 428 provided by the orchestration service 408 suggests for the user to purchase a handbag from a particular high-end handbag retailer participating in the reward program, and the user purchased the handbag through orchestration service 408, a financial reward may be received. Accordingly, the orchestration service 408 may select service providers to maximize revenue, if possible. Alternatively, the orchestration service 408 may also choose to accept no financial reward and instead pass the reward on to the user as a discount. Additionally, some service providers may push up prices if they detect interest in a particular option, e.g., certain type of shoes in particular seasons. If this behavior is known to the orchestration service 408, it can choose to cache previous service responses in the network in order to minimize the possibility of artificial price increases.

Figure 5:
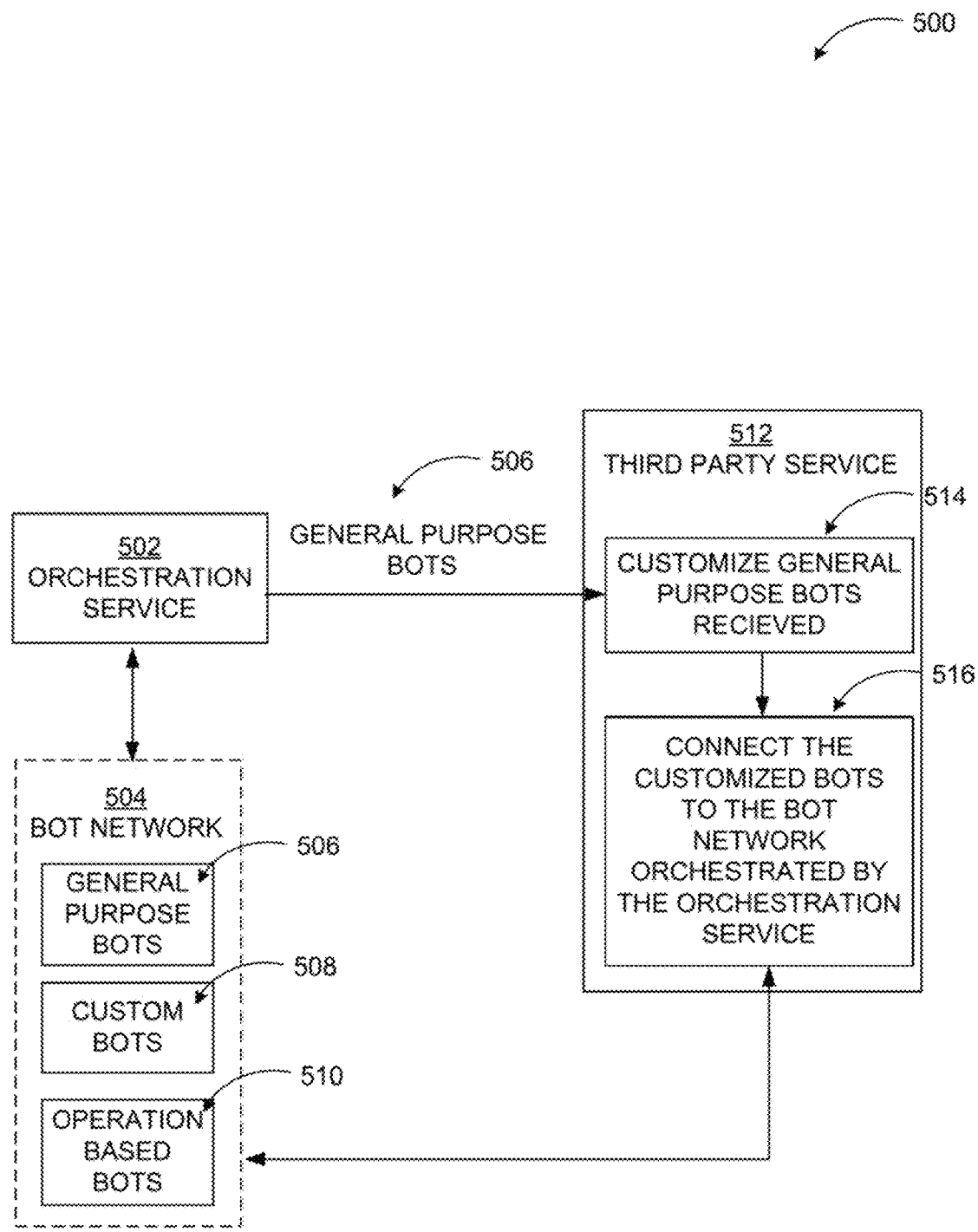
FIG. 5 includes a display diagram illustrating an example network environment where a system executing an orchestration service to perform bot network orchestration may provide third party services general purpose bots to be customized and connected with the bot network.

FIG. 5 includes a display diagram illustrating an example network environment where a system executing an orchestration service to perform bot network orchestration may provide third party services general purpose bots to be customized and connected with the bot network.

As shown in a diagram 500, an orchestration service 502 may be configured to orchestrate a bot network 504. The bots within the network may include general purposes bots 506, custom bots 508, and operation-based bots 510. The custom bots 508 may be for one or more services registered with the orchestration service 502 and/or for one or more service aspects frequently repeated in service requests received by the orchestration service 502, for example. The operation-based bots 510 may be for one or more tasks to be performed, such as aggregation, filter, search, and/or further lookup.

In some embodiments, the orchestration service 502 may provide a third party service 512 with one or more of the general purpose bots 506. The third party service 512 may, at operation 514, customize the general purpose bots to fit the needs of the third party service 512. The third party service 512 may then, at operation 516, connect and/or otherwise communicatively couple the customized bots of the third party service 512 with the bot network 504 of the orchestration service 502 in order to form a comprehensive network.

The examples provided in FIGS. 1 through 5 are illustrated with specific systems, services, and processes. Embodiments are not limited to environments according to these examples. An orchestration service configured to perform bot network orchestration in order to provide enriched service request responses may be implemented in environments employing fewer or additional systems, services, and processes. Furthermore, the example systems, services, and processes shown in FIG. 1 through 5 may be implemented in a similar manner with other user interface or action flow sequences using the principles described herein.

Figure 6:
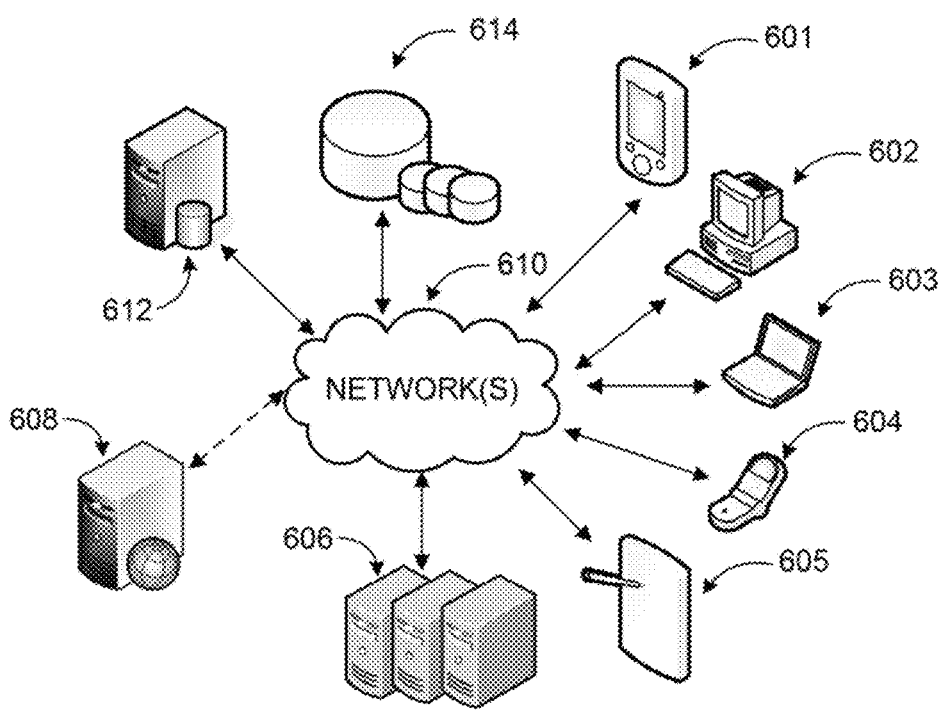
FIG. 6 is a networked environment, where a system according to embodiments may be implemented.

FIG. 6 is a networked environment, where a system according to embodiments may be implemented. An orchestrator as described herein may be employed in conjunction with hosted applications and services (for example, the client application 106 associated with the orchestration service 114, the orchestration service 114, the hosted services 120, or the external services 132) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or client application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network (s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to perform bot network orchestration to provide enriched responses to service requests. Furthermore, the networked environments discussed in FIG. 6 are for illustration purposes only. Embodiments are not limited to the example applications, engines, or processes.

Figure 7:
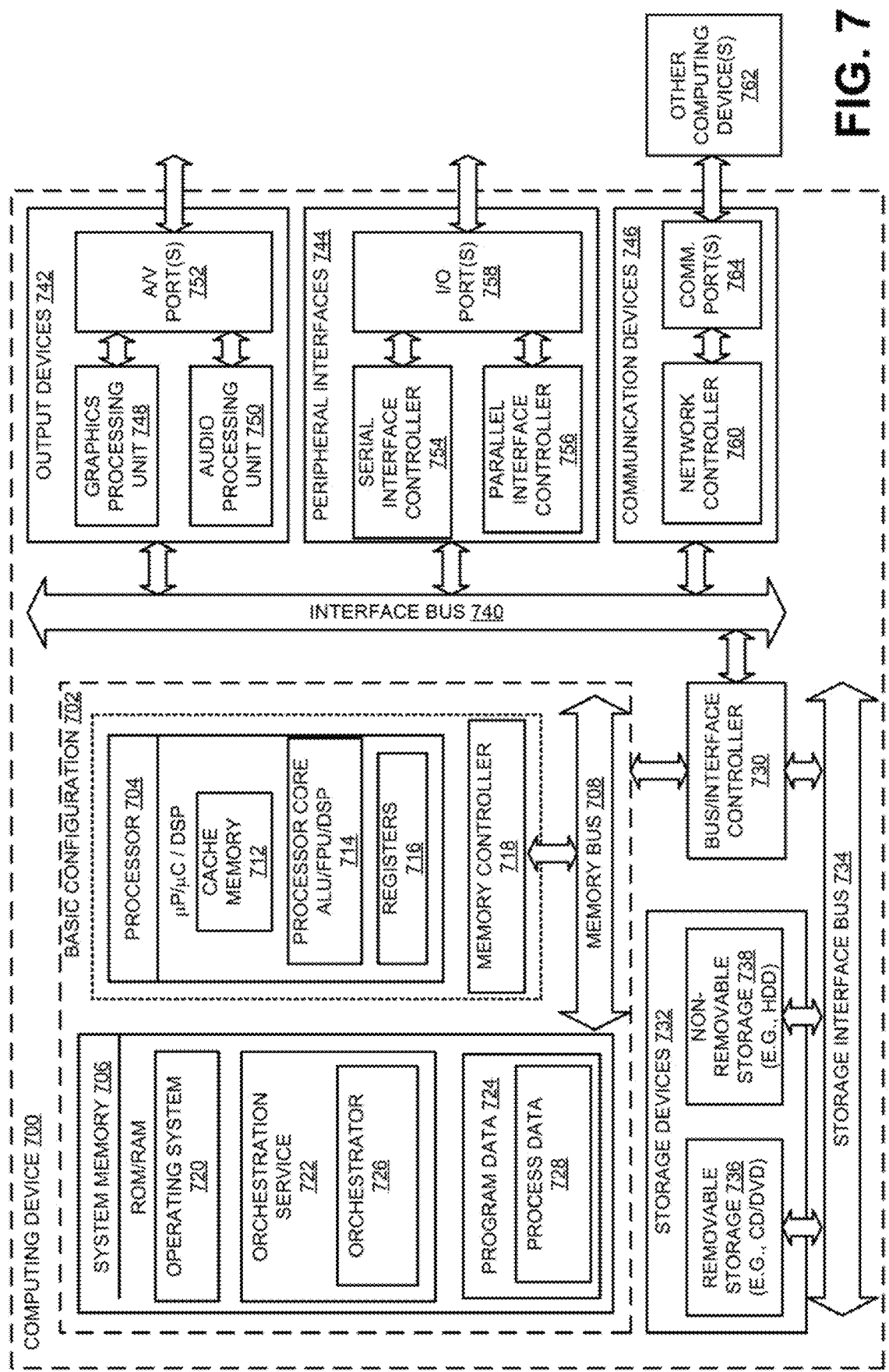
FIG. 7 is a block diagram of an example computing device, which may be used to execute an orchestration service configured to perform bot network orchestration.

FIG. 7 is a block diagram of an example computing device, which may be used to execute an orchestration service configured to perform bot network orchestration.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, an orchestration service 722, and program data 724. The orchestration service 722 may include an orchestrator 726, which may be an integrated module of the orchestration service 722 configured to perform bot network orchestration in order to provide enriched responses to service requests. For example, the orchestrator 726 may be configured to receive a service request for a user that involves at least one service provider and determine a plurality of bots to orchestrate a processing of the service request. The orchestrator 726 may then be configured to provide instructions to the plurality of bots associated with aspects of the service request, where each bot is selected based on an aspect of the service request. The orchestrator 726 may be then be configured to receive responses from the plurality of bots associated with the aspects of the service request, integrate the received responses into a service response, and provide the service response to a requestor of the service request. The program data 724 may include, among other data, process data 728, such as service request data, user information, instructions, responses, and service responses, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to perform bot network orchestration. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
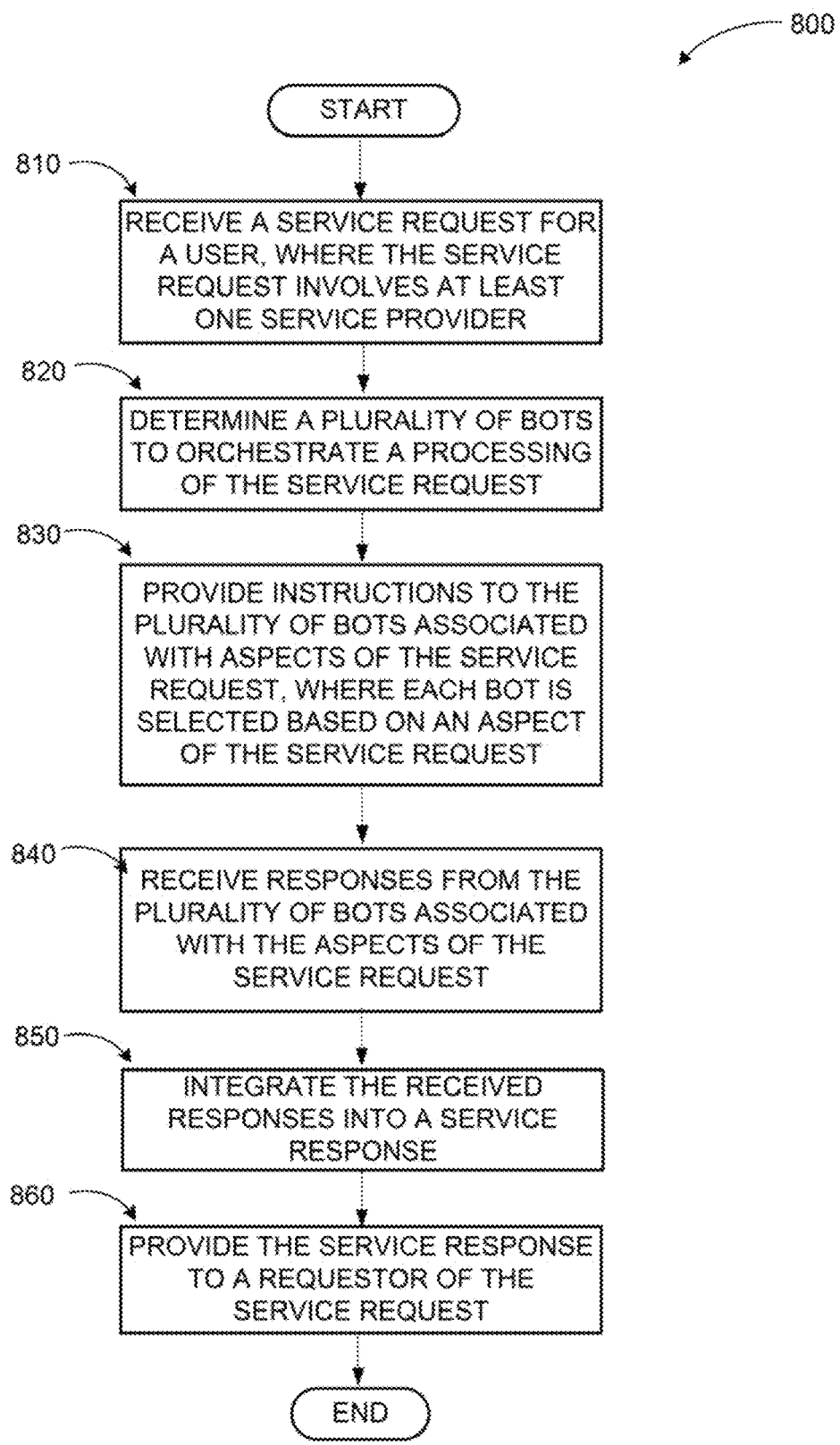
FIG. 8 illustrates a logic flow diagram of a method to perform bot network orchestration, arranged in accordance with at least some embodiments described herein.

FIG. 8 illustrates a logic flow diagram of a method to perform bot network orchestration. Process 800 may be implemented on a computing device, server, or other system. An example computing device configured to execute an orchestration service to perform bot network orchestration comprises a communication interface to facilitate communication between the computing device, at least one server, and a client device. The example server may also comprise a memory to store instructions, and one or more processors coupled to the memory. The processors, in conjunction with the instructions stored on the memory, may be configured to execute the orchestration service to perform bot network orchestration in order to provide enriched responses to service requests.

Process 800 begins with operation 810, where the processors may be configured to receive a service request for a user that involves at least one service provider. The service request may be related to travel, shopping, and/or general information gathering, among other service requests. The service request may be received through a thick or a thin client application executed on the user's device, for example. Alternatively, the service request may be received from a service provider with which the user is interacting through a thick or a thin client application executed on the user's device. For example, the service provider may be a travel service, an information service, an online purchaser service, a banking service, a financial service, a trading service, a real estate service, a healthcare provider service, or a maintenance service, among many other similar service providers.

At operation 820, the processors may be configured to determine a plurality of bots to orchestrate a processing of the service request. At operation 830, the processors may be configured to provide instructions to the plurality of bots associated with aspects of the service request, where each bot is selected based on an aspect of the service request. The aspects of the service request may include a service type, a service location, a service time or duration, and service preferences, for example. Additionally, because the determination of the plurality of bots to orchestrate the processing of the service request may be iterative, the aspect of the service request may also be a response or an aspect of the response from a bot that was previously selected to orchestrate the processing of the service request. Thus, additional bots may be selected based on the response of a previously selected bot.

At operation 840, the processors may be configured to receive responses from the plurality of bots associated with the aspects of the service request. The responses may represent one or more available services that match a list of inputs included within the instructions provided to the bots. The list of inputs may include aspects of the service request and the user information, for example.

At operation 850, the processors may be configured to integrate the received responses into a service response, and at operation 860, the processor may be configured to provide the service response to a requestor of the service request. In one example, if the user is interacting with the orchestration service through an intermediary service provider (i.e., the requestor is the intermediary service provider), the service response may be provided to a bot, a webpage, or a web service associated with the intermediary service provider. The intermediary service provider may then render the service response for display to the user. Alternatively, the requestor may be the user, to whom the service response may be provided through the thick or the thin client application executed on the user's device.

The operations included in process 800 are for illustration purposes. Bot network orchestration may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, a means to perform bot network orchestration is provided. Example means include receiving a service request for a user, where the service request involves at least one service provider, determining a plurality of bots to orchestrate a processing of the service request, and providing instructions to the bots associated with aspects of the service request, where each bot is selected based on an aspect of the service request. The example means also include receiving responses from the bots associated with the aspects of the service request, integrating the received responses into a service response, and providing the service response to a requestor of the service request.

According to some examples, methods to perform bot network orchestration are provided. An example method includes receiving a service request for a user, where the service request involves at least one service provider, determining a plurality of bots to orchestrate a processing of the service request, and providing instructions to the bots associated with aspects of the service request, where each bot is selected based on an aspect of the service request. The example method also includes receiving responses from the bots associated with the aspects of the service request, integrating the received responses into a service response, and providing the service response to a requestor of the service request.

In other examples, custom bots for one or more services or for one or more of the aspects of the service request may be selected, operation-based bots configured to perform aggregation, filter, or search tasks may be selected, and/or general purpose bots may be selected. A server may be queried for information associated with the user, and instructions may be provided to the bots associated with aspects of the service request, where each bot may be selected based on the aspect of the service request and based on the information associated with the user. The queried server may be configured to execute a productivity service, a directory service, and/or a presence service associated with the user, and the information associated with the user may include user preferences, a location of the user, and/or a schedule of the user. The user preferences may be based on a search history of the user, a browsing history of the user, a communication history of the user, an employee profile of the user, a social or professional network profile of the user, and/or preferences retrieved from a third party service.

In further examples, the aspects of the service request may include a service type, a service location, a service time or duration, and one or more service preferences. A machine learning technique may be employed to determine an additional service preference for the user that was not included within the service request. The service response may be automatically provided based on the additional service preference or service response options may be provided to the requestor for selection, where a suggested selection based on the additional service preference may be indicated. An action associated with the service response may be automatically performed if a threshold level of confidence is met based on the additional service preference.

In yet further examples, the received responses may represent one or more services from a plurality of services registered with an orchestration service that match a list of inputs included within the instructions, and the list of inputs may be based on the aspects of the service request. A service cost and a service response time may be received for each of the plurality of services upon registration with the orchestration service and the bots determined to orchestrate the processing of the service request may be based on the service cost and the service response time for each of the plurality of services. The service cost and the service response time associated with each of the one or more available services may be included in the received responses.

In other examples, an offer may be negotiated with a service via a subset of the bots, where the subset of the bots may negotiate the offer with a bot associated with the service or a server associated with the service. A determination of whether to provide a negotiated offer to the user may be based on the aspects of the service request. If one or more of the bots is associated with a service having restrictive access, a user group or a user account identifier that is allowed to use the service may be received. The service response may be analyzed to improve accuracy, update the information associated with the user, update service preferences associated with the user, offer additional services, and/or collect statistical information.

According to example embodiments, computing devices configured to execute an orchestration service to perform bet network orchestration are described. An example computing device may comprise a communication interface configured to facilitate communication between the computing device and a plurality of bots, a memory configured to store instructions, and one or more processors coupled to the communication interface and the memory. The processors may be configured to receive a service request for a user, where the service request may involve at least one service provider, determine the bots to orchestrate a processing of the service request, and provide instructions to the bots associated with aspects of the service request, where each bot may be selected based on an aspect of the service request. The processors may also be configured to receive responses from the bots associated with the aspects of the service request, integrate the received responses into a service response, and provide the service response to a requestor of the service request.

In other embodiments, the requestor may be a service provider or the user. The service provider may be a travel service, an information service, an online purchase service, a banking service, a financial service, a trading service, a real estate service, a healthcare provider service, or a maintenance service. The orchestration service may be a public service or an enterprise service. In other examples, the orchestration service may include other levels, for example, various forms of semi-private or restricted services. In an example implementation, the orchestration service may be a government service restricted to just US users.

According to some examples, systems configured to perform bot network orchestration may be described. An example system may include a first server configured to provide user-related services that include information associated with a user, and a second server configured to execute an orchestration service. The second server may be comprised of a communication interface configured to facilitate communication between the second server, the first server, and a plurality of bots, a memory configured to store instructions, and one or more processors coupled to the communication interface and the memory. The processors may be configured to receive a service request for the user, where the service request may involve at least one service provider, determine the bots to orchestrate a processing of the service request, and provide instructions to the bots associated with aspects of the service request, where each bot may be selected based on an aspect of the service request and based on the information associated with the user. The processors may be further configured to receive responses from the bots associated with the aspects of the service request, integrate the received responses into a service response, and provide the service response to a requestor of the service request.

In other examples, the processors may be further configured to dynamically modify the service response based on feedback from Internet-of-things (IoT) services. The instructions provided to the bots associated with aspects of the service request may be stored in a database such that each service can read and/or write the instructions, a file sent between each service such that each service can read, write, and/or append to the file, or a cloud-based storage service such that each service can perform a call to the cloud-based storage service instructing the cloud-based storage service to add or modify contents.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method to perform bot network orchestration, the method comprising:
    receiving, at an orchestration service, a service request for a user, wherein the service request involves at least one service provider;
    determining a plurality of bots to orchestrate a processing of the service request, wherein the plurality of bots are registered with the orchestration service and the registration includes a service response time for each of the plurality of bots;
    employing a machine learning technique to determine a service preference, wherein the machine learning is learned using past experiences of the user;
    providing instructions to the plurality of bots associated with aspects of the service request that define at least the service preference, wherein each bot is selected based on the aspects of the service request that includes at least the service preference;
    receiving responses from the plurality of bots associated with the aspects of the service request;
    integrating the received responses into a service response based on the service response time for each selected bot used to orchestrate the processing of the service request; and
    providing the service response to a requestor of the service request.

2. The computer-implemented method of claim 1, wherein determining the plurality of bots to orchestrate the processing of the service request comprises one or more of:
    selecting custom bots for one or more services or custom bots for one or more of the aspects of the service request;
    selecting operation-based bots configured to perform aggregation, filter, or search tasks; or
    selecting general purpose bots.

3. The computer-implemented method of claim 1, further comprising:

querying a server for information associated with the user, wherein each bot is selected based on the aspect of the service request and based on the information associated with the user.

4. The computer-implemented method of claim 3, wherein the queried server is configured to execute one or more of a productivity service, a directory service, or a presence service associated with the user, and wherein the information associated with the user includes one or more of user preferences, a location of the user, or a schedule of the user.

5. The computer-implemented method of claim 4, wherein the user preferences are based on one or more of a search history of the user, a browsing history of the user, a communication history of the user, an employee profile of the user, a social or professional network profile of the user, or preferences retrieved from a third party service.

6. The computer-implemented method of claim 1, wherein the aspects of the service request includes a response or an aspect of the response from a bot that was previously selected to orchestrate the processing of a previous request of the service request.

7. The computer-implemented method of claim 6, further comprising:
employing a machine learning technique to determine an additional service preference for the user that was not included within the service request; and
one of:
automatically providing the service response based on the additional service preference; or
providing service response options to the requestor for selection, wherein a suggested selection based on the additional service preference is indicated.

8. The computer-implemented method of claim 7, further comprising:
automatically performing an action associated with the service response if a threshold level of confidence is met based on the additional service preference.

9. The computer-implemented method of claim 1, wherein the received responses represent one or more services from the plurality of services registered with the orchestration service that match a list of inputs included within the instructions, and the list of inputs is based on the aspects of the service request.

10. The computer-implemented method of claim 9, further comprising:
receiving a service cost for each of the plurality of services upon registration with the orchestration service;
determining the plurality of bots to orchestrate the processing of the service request based on the service cost for each of the plurality of services; and
including the service cost associated with each of the one or more available services in the received responses.

11. The computer-implemented method of claim 1, further comprising:
negotiating an offer with a service via a subset of the plurality of bots, wherein the subset of the plurality of bots negotiate the offer with a bot associated with the service or a server associated with the service; and
determining whether to provide a negotiated offer to the user based on the aspects of the service request and/or the information associated with the user.

12. The computer-implemented method of claim 1, further comprising:
if one or more of the plurality of bots is associated with a service having restrictive access, receiving a user group or a user account identifier that is allowed to use the service.

13. A computing device configured to execute an orchestration service to perform bot network orchestration, the computing device comprising:
a communication interface configured to facilitate communication between the computing device and a plurality of bots;
a memory configured to store instructions; and
one or more processors coupled to the communication interface and the memory, the one or more processors configured to:
receive, at an orchestration service, a service request for a user, wherein the service request involves at least one service provider;
determine the plurality of bots to orchestrate a processing of the service request, wherein the plurality of bots are registered with the orchestration service and the registration includes a service response time for each of the plurality of bots;
employ a machine learning technique to determine a service preference, wherein the machine learning is learned using past experiences of the user;
provide instructions to the plurality of bots associated with aspects of the service request that define at least the service preference, wherein each bot is selected based on the aspects of the service request that includes at least the service preference;
receive responses from the plurality of bots associated with the aspects of the service request;
integrate the received responses into a service response based on the service response time for each selected bot used to orchestrate the processing of the service request; and
provide the service response to a requestor of the service request.

14. The computing device of claim 13, wherein the requestor is a service provider or the user.

15. The computing device of claim 14, wherein the service provider is a travel service, an information service, an online purchase service, a banking service, a financial service, a trading service, a real estate service, a healthcare provider service, or a maintenance service.

16. A system configured to perform bot network orchestration, the system comprising:
a first server configured to provide user-related services that include information associated with a user; and
a second server configured to execute an orchestration service, the second server comprising:
a communication interface configured to facilitate communication between the second server, the first server, a plurality of bots;
a memory configured to store instructions; and
one or more processors coupled to the communication interface and the memory, the one or more processors configured to:
receive, at an orchestration service, a service request for the user, wherein the service request involves at least one service provider;
determine the plurality of bots to orchestrate a processing of the service request, wherein the plurality of bots are registered with the orchestration service and the registration includes a service response time for each of the plurality of bots;

employ a machine learning technique to determine a service preference, wherein the machine learning is learned using past experiences of the user;

provide instructions to the plurality of bots associated with aspects of the service request that define at least the service preference, wherein each bot is selected based on the aspects of the service request that includes at least the service preference and based on the information associated with the user;

receive responses from the plurality of bots associated with the aspects of the service request;

integrate the received responses into a service response based on the service response time for each selected bot used to orchestrate the processing of the service request; and provide the service response to a requestor of the service request.

17. The system of claim 16, wherein the one or more processors are further configured to dynamically modify the service response based on feedback from Internet-of-things (IoT) services.

18. The system of claim 16, wherein the instructions provided to the plurality of bots associated with aspects of the service request are stored in one of:

a database such that each service can read and/or write the instructions;

a file sent between each service such that each service can read, write, and/or append to the file; and a cloud-based storage service such that each service can perform a call to the cloud-based storage service instructing the cloud-based storage service to add or modify contents.

19. The computer-implemented method of claim 1, wherein the employing the machine learning technique to determine the service preference includes the machine learning technique being one of at least case-based reasoning, rule-based systems, artificial neural networks, genetic algorithms, cellular automata, fuzzy models, multi-agent systems, swarm intelligence, reinforcement learning or hybrid systems.

20. The computer-implemented method of claim 1, wherein the orchestration service optimizes computing resources by only providing the instructions to the plurality of bots that meet the service preference.

* * * * *